(12) United States Patent
Huang et al.

(10) Patent No.: US 6,292,456 B1
(45) Date of Patent: Sep. 18, 2001

(54) APPARATUS FOR ACTIVATING A DISK CLAMPER BY MAGNETIC RESTORING FORCE

(75) Inventors: An-Ying Huang, Tainan Hsien; Chau-Yuan Ke, Pingtung Hsien, both of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/263,767

(22) Filed: Mar. 5, 1999

(30) Foreign Application Priority Data

Jul. 9, 1998 (TW) ................................................ 87111272

(51) Int. Cl.⁷ ...................................................... G11B 23/00
(52) U.S. Cl. .............................................................. 369/270
(58) Field of Search ................................... 369/270, 271; 360/99.12

(56) References Cited

U.S. PATENT DOCUMENTS

| | | | |
|---|---|---|---|
| 4,570,194 | * | 2/1986 | Schatteman ............................ 360/97 |
| 5,001,700 | * | 3/1991 | Rowden et al. ....................... 369/270 |
| 5,006,945 | * | 4/1991 | Furusawa ........................... 360/99.12 |
| 5,128,818 | * | 7/1992 | Koizumi et al. ................... 360/99.04 |
| 5,748,406 | * | 5/1998 | Morimoto et al. ................. 360/99.12 |
| 5,751,688 | * | 5/1998 | Mizuno et al. ....................... 369/270 |
| 6,108,294 | * | 8/2000 | Iwanaga ............................... 369/270 |

\* cited by examiner

*Primary Examiner*—Brian E. Miller
*Assistant Examiner*—Kenneth W Fields
(74) *Attorney, Agent, or Firm*—Dykema Gossett PLLC

(57) ABSTRACT

An apparatus for activating a disk clamper by magnetic restoring force is provided for an optical disk drive having a casing and a cartridge for carrying an optical disk along a path in the optical disk drive. A spindle motor is mounted below the casing that is made of material which can be induced by a magnet. A disk clamper includes a magnet mounted therein and has a central axle coaxial with a central axis of the spindle motor. The disk clamper and the spindle motor are respectively located on two sides of the disc when the cartridge is inside the optical disk drive for securely clamping the optical disk together. When the spindle motor moves upwardly, the disk clamper is moved downwardly to clamp the optical disk in the cartridge under action of magnetic force between the spindle motor and the magnet in the disk clamper. When the spindle motor moves downwardly, the disk clamper is moved upwardly under action of magnetic force between the magnetic casing and the magnet in the disk clamper, thereby preventing an obstacle to inward and outward movements of the cartridge into and out from the optical disk drive.

8 Claims, 4 Drawing Sheets

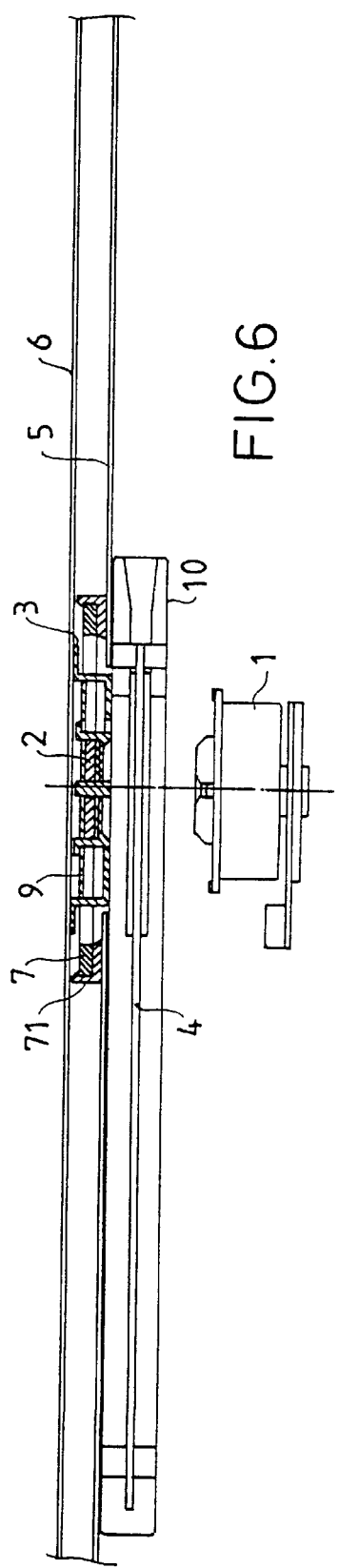
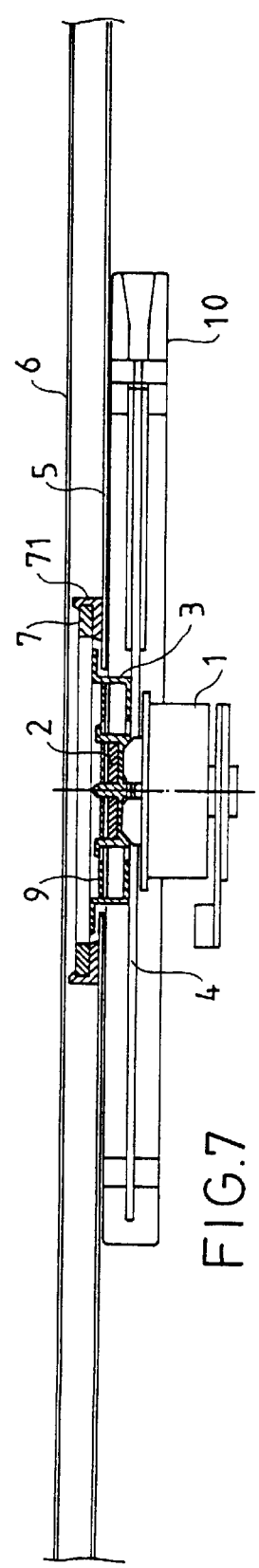
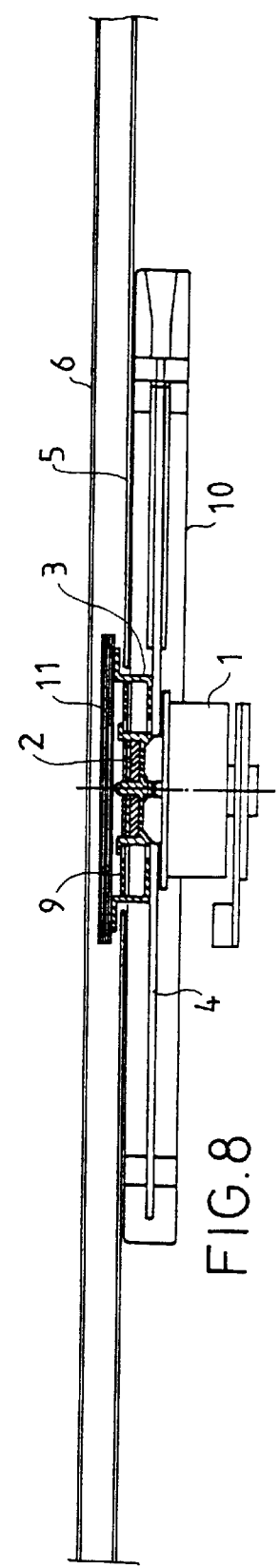
FIG.6
FIG.7
FIG.8

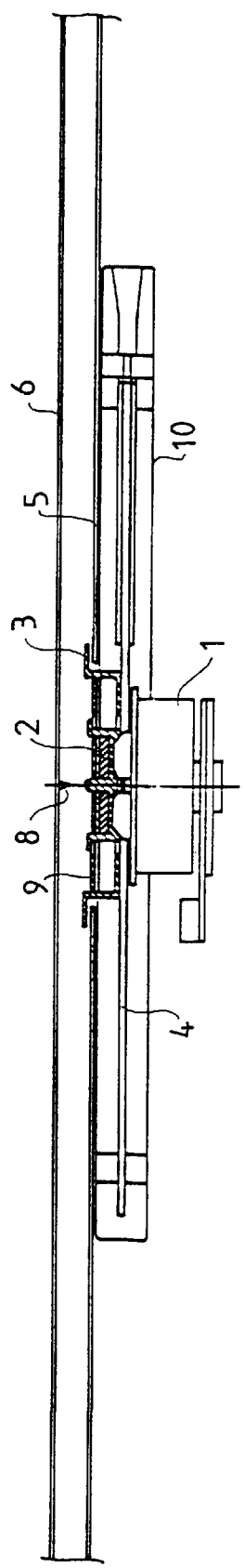
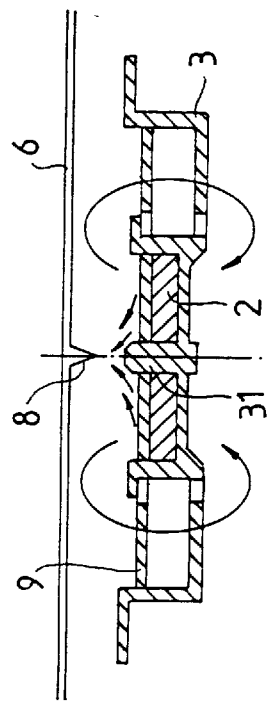

APPARATUS FOR ACTIVATING A DISK CLAMPER BY MAGNETIC RESTORING FORCE

BACKGROUND OF THE INVENTION

1. Field of the Invention

The present invention relates to a disk clamper, and more particularly to an apparatus for activating a disk clamper by magnetic restoring force in which the disk clamper automatically moves upwardly or downwardly without interference with the optical disk cartridge and the disk clamper has a centering effect and a vibration-absorbing effect.

2. Description of the Related Art

A recordable optical disk drive generally includes a cartridge 13 (see FIG. 1 of the drawings) for protecting an optical disk. The cartridge 13 generally has a thickness of 8 mm and thus occupies a considerable space. The cartridge 13 may be interfered with by a disk clamper 12 when the former moves into or out from the optical disk drive. In order to avoid such interference, an elastic member 14 is provided to lift a lever 15 and thus the disk clamper 12 to a position above the lever 15 (FIG. 2). Thus, the disk clamper 12 is not impinged during the inward or outward movement of the cartridge 13 (FIG. 3). When the cartridge 13 approaches its innermost position, the lever 15 is contacted and thus urges the disk clamper 12 to move downwardly and thus "clamps" the optical disk, as shown in FIG. 4. Such a design requires many elements and the elastic member 14 has to be riveted to the disk clamper 12. Further, vertical movement of the lever 15 requires a considerable space. This is not advantageous to the design of optical disk drives.

SUMMARY OF THE INVENTION

It is a primary object of the invention to provide an apparatus for activating a disk clamper by magnetic restoring force to automatically move the disk clamper upwardly or downwardly without interference with the optical disk.

It is another object of the invention to provide an apparatus for activating a disk clamper by magnetic restoring force to reduce the space required for operation and the number of elements and thus simplify the assembly procedure.

It is a further object of the invention to provide an apparatus for activating a disk clamper by magnetic restoring force, in which the disk clamper may be automatically centered and vibrations thereof can be absorbed.

It is still another object of the present invention to provide an apparatus for activating a disk clamper by magnetic restoring force, in which friction between elements is avoided by means of interacting magnetic forces between magnetic members mounted in the disk clamper and other components.

The above objects are achieved by means of providing magnetic restoring force to replace the conventional design using elastic members and levers such that the magnetic restoring force between the magnetic members in the disk clamper and the magnetic casing of the optical disk drive and/or an annular magnet in the chucking plate may automatically lift or lower the disk clamper. Thus, an active force for activating the disk clamper is provided.

In accordance with one aspect of the invention, an apparatus for activating a disk clamper by magnetic restoring force is provided for an optical disk drive having a casing and a cartridge for carrying an optical disk along a path in the optical disk drive. The apparatus comprises:

a chucking plate adapted to be securely mounted below the casing, the casing being made of material which can be induced by a magnet such as ferric plate, the chucking plate including an opening;

a spindle motor mounted below the chucking plate and having a central axis;

a disk clamper slidably received in the opening of the chucking plate, the disk clamper including a magnet mounted therein, the disk clamper and the spindle motor being respectively located on two sides of the optical disk when the cartridge is inside the optical disk drive for securely clamping the optical disk together; and an annular magnetic means mounted in the chucking plate and around the disk clamper, whereby when the spindle motor moves upwardly, the disk clamper is moved downwardly to clamp the optical disk in the cartridge under action of magnetic force between the spindle motor and the magnet in the disk clamper, while the disk clamper is retained in position coaxial with the central axis of the spindle motor under action of casing, the magnet in the disk clamper, and the magnetic protrusion, thereby not causing an obstacle to inward movements of the cartridge into and out from the optical disk drive.

In accordance with a further aspect of the invention, an apparatus for activating a disk clamper by magnetic restoring force is provided for an optical disk drive having a casing and a cartridge for carrying an optical disk along a path in the optical disk drive. The improvement of the apparatus includes:

a casing being made of material which can be induced by a magnet such as ferric plate;

a spindle motor mounted below the casing and having a central axis; and a disk clamper including a magnet mounted therein and having a central axle coaxial with the central axis of the spindle motor, the disk clamper and the spindle motor being respectively located on two sides of the disc when the cartridge is inside the optical disk drive for securely clamping the optical disk together, whereby when the spindle motor moves upwardly, the disk clamper is moved downwardly to clamp the optical disk in the cartridge under action of magnetic force between the spindle motor and the magnet in the disk clamper, and when the spindle motor moves downwardly, the disk clamper is moved upwardly under action of magnetic force between the magnetic casing and the magnet in the disk clamper, thereby not causing an obstacle to inward and outward movements of the cartridge into and out from the optical disk drive.

The magnetic elements are small and thus can be easily installed without occupying a considerable space. In addition, the space required for operation is relatively small, the number of elements is reduced, and the assembly procedure is simplified. Further, friction between elements is avoided as the active forces are magnetism.

Other objects, advantages, and novel features of the invention will become more apparent from the following detailed description when taken in conjunction with the accompanying drawings.

BRIEF DESCRIPTION OF THE DRAWINGS

FIGS. 6 and 7 are schematic side views, partly in section, illustrating operation of the apparatus of FIG. 5;

FIG. 8 is a schematic side view, partly in section, illustrating a second embodiment of the apparatus for activating a disk clamper by magnetic restoring force in accordance with the present invention;

FIG. 9 is a schematic side view, partly in section, illustrating a third embodiment of the apparatus for activating a disk clamper by magnetic restoring force in accordance with the present invention; and FIG. 10 is an enlarged sectional view illustrating a portion of the apparatus of FIG. 9.

DETAILED DESCRIPTION OF THE PREFERRED EMBODIMENT

Figure 1:
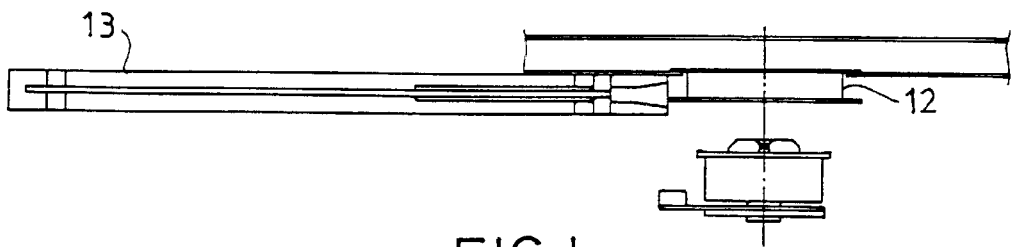
FIG. 1 is schematic side view of a disk clamper and a cartridge of an optical disk drive according to the prior art.
Figure 2:
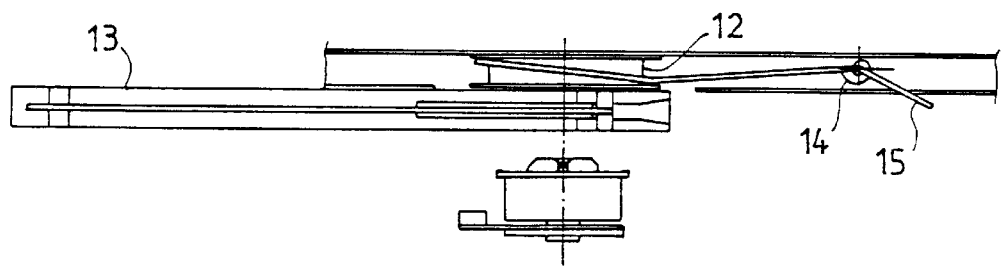
FIGS. 2 to 4 illustrate operation of the disk clamper and cartridge of FIG. 1.
Figure 3:
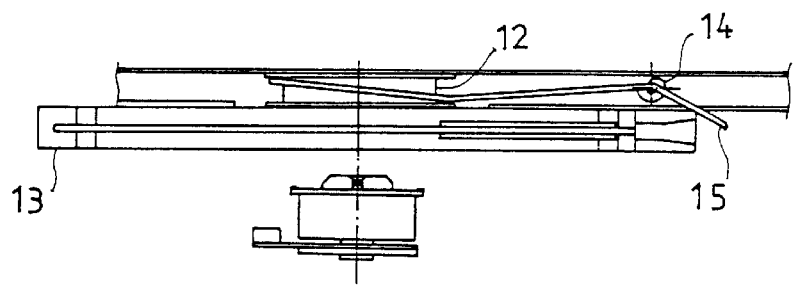
Figure 4:
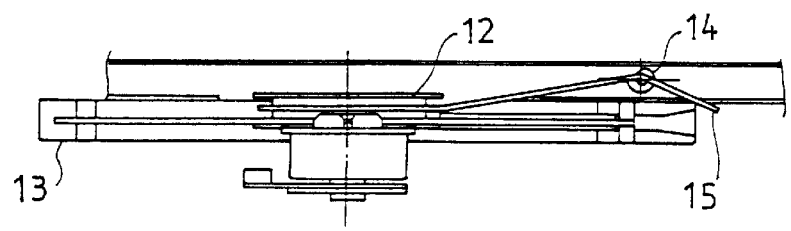
Figure 5:
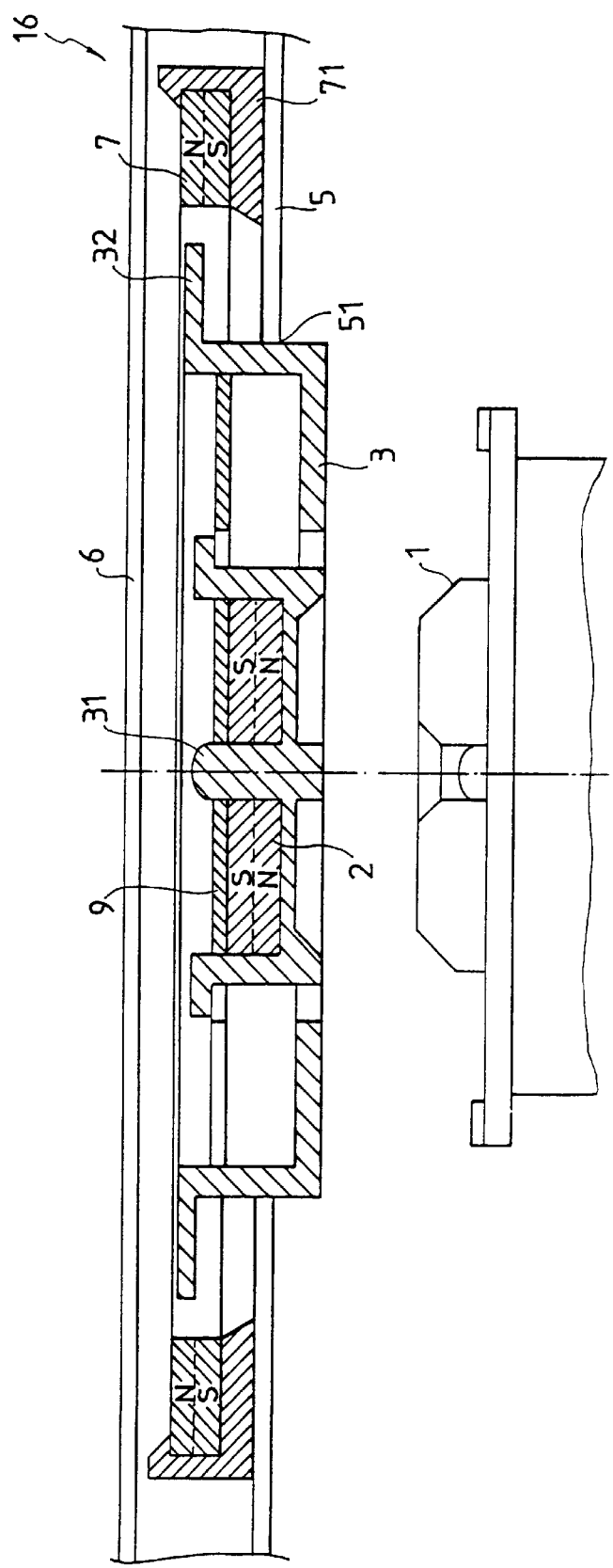
FIG. 5 is a schematic side view, partly in section and in a reduced scale, illustrating a first embodiment of an apparatus for activating a disk clamper by magnetic restoring force in accordance with the present invention.

FIG. 5 shows a side view of a first embodiment of an apparatus for activating a disk clamper by magnetic restoring force in accordance with the present invention. The apparatus generally includes a chucking plate 5 securely mounted below a casing 6 of an optical disk drive 16. The chucking plate 5 includes an opening 51 for receiving a disk clamper 3, which, in turn, receives a magnet 2 therein. The disk clamper 3 includes a flange 32 resting on an annular periphery that defines the opening 51 of the chucking plate 5 to support the disk clamper 3. The chucking plate 5 further includes an annular magnet 7 mounted therein and around the disk clamper 3. The magnet 2 is mounted above a spindle motor 1 located below the chucking plate 5 and is retained in position by a yoke 9. All of the elements are mounted co-axially. The casing 6 is made of material which can be induced by a magnet. Both of the magnet 2 and the magnet 7 are axially, unidirectionally magnetized. In addition, the poles of the magnet 2 are arranged to be opposite to those of the magnet 7, best shown in FIG. 5.

Referring to FIG. 6, before a cartridge 10 of the optical disk drive 16 retracts into the later, the spindle motor 1 is at its lower position. At this moment, a magnet force among the magnet 2, the annular magnet 7, and the magnetic casing 6 may together retain the disk clamper 3 at a level above a path of the cartridge 10 and thus not cause an obstacle to entrance of the cartridge 10.

Referring to FIG. 7, after cartridge 10 enters the optical disk drive 16, the spindle motor 1 moves upwardly such that the magnet 2 in the disk clamper 3 and the spindle motor 1 attracts each other and thus move the disk clamper 3 downwardly to "clamp" an optical disk 4 in the cartridge 10. When the spindle motor 1 begins to rotate, in the case that the disk clamper 3 that is coaxial with the spindle motor 1 deviates from a central axis of the spindle motor 1 under the action of eccentric force, the magnet 2 also deviates from a center of the annular magnet 7. Since the poles of the annular magnet 7 are arranged to be opposite to those of the magnet 2, the magnet 2 is repulsed. Thus, a central axle 31 of the disk clamper 3 is brought back to be aligned with the central axis of the spindle motor 1 (FIG. 5). Namely, the disk clamper 3 is automatically centered and positioned. If the disk clamper 3 vibrates, the magnet 2 will deviate from the central axis too, yet the repulsion between the annular magnet 7 and the magnet 2 will return the magnet and thus eliminate vibration effect.

When the spindle motor 1 moves downwardly, the magnet 2 is attracted by the magnetic casing 6 and the annular magnet 7 and thus moved upwardly. The central axle 31 of the disk clamper 3 is moved horizontally toward a center of the annular magnet 7. Then, the disk clamper 3 is moved upwardly to a level above the path of the cartridge 10 and thus shall not obstruct outward movement of the cartridge 10.

FIG. 8 illustrates a second embodiment of the invention, in which the annular magnet 7 is replaced by a coil 11 coaxially, securely mounted above the chucking plate 5 and having an outer diameter greater than that of the disk clamper 3. When electricity is provided to the coil 11, a magnetic force can be generated. The coil 11 has an inner diameter greater than an outer diameter of the disk clamper 3.

When the spindle motor 1 begins to rotate, in the case that the disk clamper 3 that is coaxial with the spindle motor 1 deviates from a central axis of the spindle motor 1 under the action of eccentric force, the magnet 2 also deviates from the central axis. At this moment, the coil 11 provides a centripetal magnetic force to the magnet 2 such that the magnet 2 brings the disk clamper 3 back to a position aligned with the central axis of the spindle motor 1. Namely, the disk clamper 3 is automatically centered and positioned. If the disk clamper 3 vibrates, the magnet 2 will deviate from the central axis too, yet a magnetic repulsion is generated between the coil 11 and the magnet 2. As a result, a magnetic repulsion in a direction opposite to the deviating direction of the magnet 2 is provided to return the magnet 2 to thereby eliminate vibration effect.

When the spindle motor 1 moves downwardly, the magnet 2 is attracted by the magnetic casing 6 and the magnetic force provided by the coil 11 and thus moved upwardly. The central axle 31 of the disk clamper 3 is moved horizontally toward a central axis of the coil 11. Then, the disk clamper 3 is moved upwardly to a level above the path of the cartridge 10 and thus shall not obstruct outward movement of the cartridge 10. According to the second embodiment of the invention, electricity supplied to the coil to generate the magnetic force can be controlled by means of opening/closing of the cartridge 10 to thereby control upward/downward movement of the disk clamper 3. Furthermore, the magnitude of the magnetic force provided by the coil 11 can be easily adjusted.

FIG. 9 illustrates a third embodiment of the invention, in which the annular magnet 7 is omitted. Instead, the casing 6 includes a protrusion 8 extended downwardly therefrom and aligned with the central axle 31 of the disk clamper 3. The protrusion 8, as shown in FIG. 10, may be ball-like or pointed and is also made of magnetic material. As a magnetic field tends to be accumulated in a pointed area, the magnetic force will directed toward the pointed protrusion 8 when the magnet 2 attracts the casing 6 to achieve the same function provided by the annular magnet 7.

When the spindle motor 1 moves upwardly, the magnet 2 in the chucking plate 3 and the spindle motor 1 attract each other and thus cause the chucking plate 3 to move downwardly and thus clamp the optical disk 4.

When the spindle motor 1 begins to rotate, in the case that the disk clamper 3 that is coaxial with the spindle motor 1 deviates from a central axis of the spindle motor 1 under the action of eccentric force, the magnet 2 also deviates from the central axis. At this moment, the protrusion 8 provides a centripetal magnetic force to the magnet 2 such that the magnet 2 brings the disk clamper 3 back to a position aligned with the central axis of the spindle motor 1. Namely, the disk clamper 3 is automatically centered and positioned. If the disk clamper 3 vibrates, the magnet 2 will deviate from the central axis too, yet a magnetic repulsion is generated between the protrusion 8 and the magnet 2. As a result, a magnetic repulsion in a direction opposite to the deviating direction of the magnet 2 is provided to return the magnet 2 to thereby eliminate vibration effect. When the spindle motor 1 moves downwardly, the magnet 2 is attracted by the magnetic casing 6 and thus moved upwardly. The disk clamper 3 is moved upwardly to a level above the path of the cartridge 10 and thus shall not obstruct outward movement of the cartridge 10.

According to the above description, it is appreciated that the disk clamper 3 shall not cause an obstacle to inward and outward movements of the cartridge 10 as the disk clamper 3 is moved to a level above the path of the cartridge 10 by means of magnetic force between the magnet 2, the annular magnet 7 in the chucking plate 5, and the casing 6. In addition, the disk clamper 3 is automatically centered and positioned under the action of magnetic force to eliminate vibration effect. The magnetic elements disclosed herein are small and thus can be mounted easily without occupying a considerable space. In addition, friction between elements is avoided, as the active forces are magnetism.

Although the invention has been explained in relation to its preferred embodiment, it is to be understood that many other possible modifications and variations can be made without departing from the spirit and scope of the invention as hereinafter claimed.

What is claimed is:

1. An apparatus for activating a disk clamper of an optical disk drive having a casing and a cartridge for carrying an optical disk along a path in the optical disk drive, the apparatus comprising:

a chucking plate adapted to be securely mounted below the casing, the casing being made of material which can be induced by a magnet, the chucking plate including an opening;

a spindle motor mounted below the chucking plate and having a central axis;

a disk clamper received in the opening of the chucking plate, the disk clamper including a magnet mounted therein, the disk clamper and the spindle motor being respectively located on two sides of the optical disk when the cartridge is inside the optical disk drive for securely clamping the optical disk together; and an annular magnetic means mounted in the chucking plate and around the disk clamper;

whereby when the spindle motor moves upwardly, the disk clamper is moved downwardly to clamp the optical disk in the cartridge under action of magnetic force between the spindle motor and the magnet in the disk clamper, while the disk clamper is retained in a position coaxial with the central axis of the spindle motor under action of magnetic force between the magnet in the disk clamper and the annular magnetic means in the chucking plate, and when the spindle motor moves downwardly, the disk clamper is moved upwardly to a level above the path of the cartridge under action of magnetic force among the magnetic casing, the magnet in the disk clamper, and the annular magnetic means in the chucking plate, thereby not causing an obstacle to inward and outward movements of the cartridge into and out from the optical disk drive.

2. The apparatus according to claim 1, wherein the magnet in the chucking plate is axially, unidirectionally magnetized.

3. The apparatus according to claim 1, wherein the annular magnetic means is an annular magnet.

4. The apparatus according to claim 1, wherein the disk clamper includes a flange resting on an annular periphery that defines the opening of the chucking plate to support the clamper.

5. An apparatus for activating a disk clamper of an optical disk drive for carrying an optical disk along a path in the optical disk drive, the apparatus comprising:

a casing made of material which can be induced by a magnet;

a spindle motor mounted below the casing and having a central axis;

a disk clamper including a magnet mounted therein and having a central axle coaxial with the central axis of the spindle motor, the disk clamper and the spindle motor being respectively located on two sides of the disk when the cartridge is inside the optical disk drive for securely clamping the optical disk together; and a chucking plate securely mountable below the casing and including a magnet for repulsing said magnet of the disk clamper;

whereby when the spindle motor moves upwardly, the disk clamper is moved downwardly to clamp the optical disk in the cartridge under action of magnetic force between the spindle motor and the magnet in the disk clamper, and when the spindle motor moves downwardly, the disk clamper is moved upwardly under action of magnetic force between the magnetic casing and the magnet in the disk clamper, thereby not causing an obstacle to inward and outward movements of the cartridge into and out from the optical disk drive.

6. The apparatus according to claim 5, wherein the magnet in the chucking plate is axially, unidirectionally magnetized.

7. The apparatus according to claim 5, wherein the chucking plate is securely mounted below the casing and includes an opening for slidably receiving the disk clamper, the disk clamper including a flange resting on an annular periphery that defines the opening of the chucking plate to support the clamper.

8. The apparatus according to claim 7, wherein the magnet of the chucking plate is an annular magnet mounted around the opening and coaxial with the central axle of the disk clamper.

* * * * *